F. D. REID.
BICYCLE BRAKE.
APPLICATION FILED MAR. 15, 1913.
1,107,113.
Patented Aug. 11, 1914.
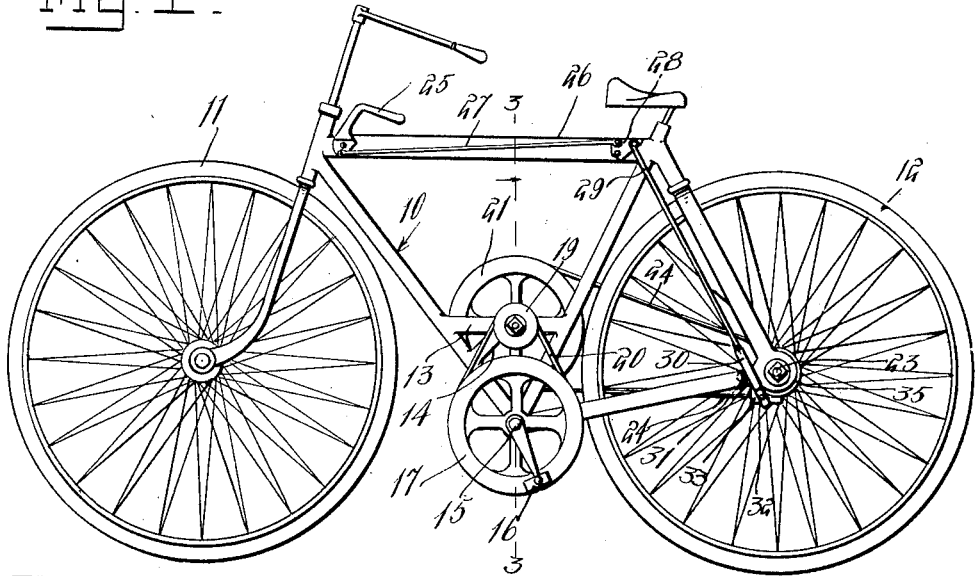
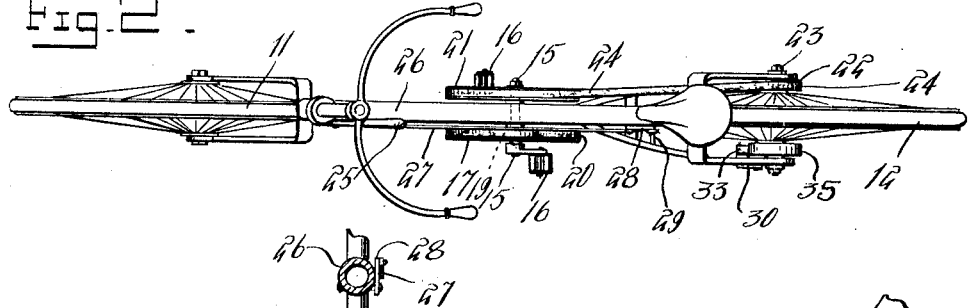
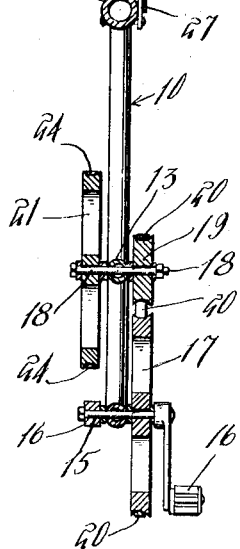
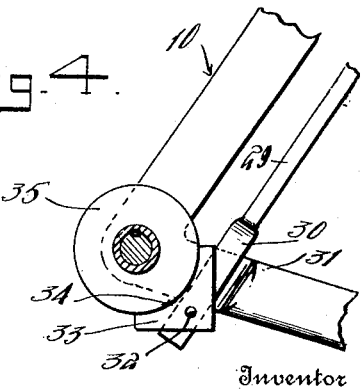
Inventor
F. D. Reid.
Witnesses
By
Attorneys

UNITED STATES PATENT OFFICE.

FREDRICK D. REID, OF LAUREL, MISSISSIPPI.

BICYCLE-BRAKE.

1,107,113. Specification of Letters Patent. Patented Aug. 11, 1914.

Application filed March 15, 1913. Serial No. 754,481.

*To all whom it may concern:*

Be it known that I, FREDRICK D. REID, a citizen of the United States, residing at Laurel, in the county of Jones, State of Mississippi, have invented certain new and useful Improvements in Bicycle-Brakes; and I do hereby declare the following to be a full, clear, and exact description of the invention, such as will enable others skilled in the art to which it appertains to make and use the same.

This invention relates to novel and useful improvements in bicycle brakes.

The essential object of the invention is to provide an improved brake structure which includes pivotally connected rods and levers mounted on the frame and mounted in a novel manner and having a brake pivoted thereto in a novel form for coöperation with a brake disk formed by the rear hub.

With the above and other objects in view, the invention resides more particularly in the peculiar combinations and arrangements of parts, which will be partly illustrated in the accompanying drawings and described in the specification, although the invention is protected for all desirable changes and uses within the scope of the invention as claimed.

In the drawings: Figure 1 is a side elevation of my improved bicycle with the braking mechanism in inoperative position. Fig. 2 is a top plan view thereof. Fig. 3 is a vertical sectional view taken on the line 3—3 of Fig. 1, and looking in the direction of the arrows. Fig. 4 is an elevation of a fragmentary portion of the device looking toward the opposite side from that shown in Fig. 1 and with the rear drive wheel removed.

In illustrating the preferred embodiment of the invention, there is shown a bicycle having a frame 10 provided with the usual front steering wheel 11 and the rear drive wheel 12. The triangular portion of the frame 10 carries a cross brace 13 which connects the inclined portions of the frame and said cross brace 13 is made rigid by a forwardly inclined brace 14. The usual crank hanger carries a crank shaft 15 having the usual propelling pedals 16 and said shaft carries a grooved pulley or drive wheel 17 at one side of the frame.

The cross brace 13 has a bearing portion in which is rotatably mounted a shaft 18 on one end of which a grooved pulley or wheel 19 is keyed, so that the shaft may be driven by means of an endless drive member or belt 20 engaged around the pulleys 17 and 19. The shaft 18 carries a relatively large grooved pulley or wheel 21 on its opposite end, being substantially the same diameter as the pulley 17 and considerably larger than the pulley 19, so that rotation imparted to the shaft 18 may be transferred from the pulley 21 to the rear drive or propelling wheel 12 through the medium of a grooved pulley 22 keyed to the rear axle 23, and an endless drive member or belt 24 engaged around the pulleys 21 and 22 respectively. By this means the rear wheel may be caused to revolve at a high speed of rotation, as the gear is considerably multiplied and the feet will therefore travel at a slow rate.

The improved brake constituting a part of the invention embodies an angular lever 25 pivoted near its lower end to the cross bar 26 of the frame and having its opposite extremity connected by a rod 27 to an angle plate 28 pivoted on the frame and constituting a rocking lever. The plate is pivoted near its lower corner and the rod 27 is pivoted to one of the upper corners of the plate. The rod 29 is pivoted to the remaining corner and extended downwardly in front of the rear fork, and has its lower end provided with a forked portion or bifurcation 30 which straddles the lower rear fork of the frame. This bifurcation or fork portion operates over the flattened or drop forged portion of the rear forks at one side and is held from longitudinal shifting by a shoulder 31 produced by flattening said part at an abrupt angle. The inner leg of the bifurcation or forked portion 30 of the rod 29 is considerably longer than the outer portion and has connected thereto as by means of a pivot 32, a triangular brake shoe 33, the base of which is formed concavely arcuate as shown at 34, producing a concaved engaging face. A brake disk 35 is fixed to the rear drive wheel for engagement by the shoe 33 and when the parts are in normal position the lever 25 is raised so that its gripping portion is substantially horizontally extended and the rods 27 and 29 are shifted rearwardly and downwardly respectively, so that the shoe is disengaged from the brake disk. However, when the lever 25 is moved downwardly, said rods are oppositely shifted and the brake shoe drawn in contact with the periphery of the disk so that the frictional contact of said parts will bring the wheel to a stop. By reason of the pivotal connection of the brake shoe with its operating rod, a positive seating of the shoe against the disk is provided for and a shoe can thus be made considerably larger so as to cover a greater area of the disk than if it were formed stationary or rigid therewith.

I claim:

The combination with a bicycle frame having a front steering wheel and a rear drive wheel and means for driving said wheels; of a brake mechanism for the wheel, said mechanism embodying a disk fixed to the rear wheel, a portion of the frame having a flattened portion producing a shoulder, a rod having a bifurcated portion slidable on said flattened portion adjacent the rear portion of the frame, a shoe pivoted to one leg portion of said bifurcation and having a concaved face engaging the disk, a triangular plate pivoted on the horizontal portion of the frame and pivotally connected to said rod, a lever pivoted to said horizontal portion of the frame and having a gripping portion disposed in substantial horizontal position and a rod connecting said lever and the triangular plate.

In testimony whereof, I affix my signature, in the presence of two witnesses.

FREDRICK D. REID.

Witnesses:
B. F. CARTER,
J. A. BOYD.

---

Copies of this patent may be obtained for five cents each, by addressing the "Commissioner of Patents, Washington, D. C."